(12) United States Patent
Kim et al.

(10) Patent No.: US 10,101,830 B2
(45) Date of Patent: Oct. 16, 2018

(54) ELECTRONIC DEVICE AND METHOD FOR CONTROLLING OPERATION ACCORDING TO FLOATING INPUT

(71) Applicant: Samsung Electronics Co., Ltd., Suwon-si, Gyeonggi-do (KR)

(72) Inventors: Myung-Sik Kim, Suwon-si (KR); Joon-Oo Kim, Suwon-si (KR); Sun-Ah Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 14/514,835

(22) Filed: Oct. 15, 2014

(65) Prior Publication Data

US 2015/0109224 A1 Apr. 23, 2015

(30) Foreign Application Priority Data

Oct. 17, 2013 (KR) .................. 10-2013-0124213

(51) Int. Cl.
| | | |
|---|---|---|
| G09G 1/00 | (2006.01) | |
| G06F 3/041 | (2006.01) | |
| G06F 3/0488 | (2013.01) | |
| G06F 3/0484 | (2013.01) | |

(52) U.S. Cl.
CPC ............ *G06F 3/041* (2013.01); *G06F 3/0488* (2013.01); *G06F 3/04842* (2013.01); *G06F 2203/04108* (2013.01)

(58) Field of Classification Search
CPC ........ G06F 3/03545; G06F 3/041; G06F 3/01; G06F 3/017; G06F 3/0488; G06F 17/30
See application file for complete search history.

(56) References Cited

U.S. PATENT DOCUMENTS

| | | | |
|---|---|---|---|
| 9,594,499 B2* | 3/2017 | Britton | .................. G06F 3/0488 |
| 2013/0021288 A1* | 1/2013 | Karkkainen | ............ G06F 3/016 |
| | | | 345/173 |
| 2014/0200080 A1 | 7/2014 | Kim | |
| 2014/0253522 A1* | 9/2014 | Cueto | ................. G06F 3/03545 |
| | | | 345/179 |
| 2014/0292729 A1* | 10/2014 | Besperstov | ......... G06F 3/03545 |
| | | | 345/179 |

FOREIGN PATENT DOCUMENTS

| | | |
|---|---|---|
| KR | 2012-0126508 A | 11/2012 |
| KR | 2012-0138329 A | 12/2012 |
| KR | 2013-0022996 A | 3/2013 |

* cited by examiner

*Primary Examiner* — Michael Faragalla
(74) *Attorney, Agent, or Firm* — Jefferson IP Law, LLP

(57) ABSTRACT

An electronic device and a method for performing an operation according to a floating input are provided. The electronic device includes an input unit, a display unit for displaying a user interface, and a controller configured to, when a floating input by the input unit is detected while a first application is being executed, control the first application to perform an operation corresponding to the detected floating input.

17 Claims, 15 Drawing Sheets

ELECTRONIC DEVICE AND METHOD FOR CONTROLLING OPERATION ACCORDING TO FLOATING INPUT

CROSS-REFERENCE TO RELATED APPLICATION(S)

This application claims the benefit under 35 U.S.C. § 119(a) of a Korean patent application filed on Oct. 17, 2013 in the Korean Intellectual Property Office and assigned Serial number 10-2013-0124213, the entire disclosure of which is hereby incorporated by reference.

TECHNICAL FIELD

The present disclosure relates to an electronic device and a method for control. More particularly, the present disclosure relates to an electronic device and a method for controlling an operation through a floating input.

BACKGROUND

In general, a user interface displayed on an electronic device includes a background screen image and a menu configuration image. When a menu screen is displayed, menu items are configured and displayed in text form or icon form.

When menu items are displayed and one of the displayed menus is selected by a user input means such as a mouse or a user's finger, an electronic device performs a terminal function corresponding to the selected menu. At this time, the user input means includes a touch input means such as a finger, and a stylus pen that can make a touch input, and point input means such as a mouse, a blow up mouse, and an eye mouse using pupils.

When the user desires to select an additional function or change a setting, the electronic device may display an option menu, selecting a function, or change a setting through the user input means.

When an application screen being executed is displayed and thus the option menu cannot be displayed on the screen, the electronic device may display a button for displaying the option menu on a particular area of the screen, and display an option screen on the application screen when an input by the displayed button is received. For example, when the menu screen having several steps is displayed, the electronic device displays the screen such that the menu screen having the several steps overlaps according to the selected button for displaying a particular menu.

The above information is presented as background information only to assist with an understanding of the present disclosure. No determination has been made, and no assertion is made, as to whether any of the above might be applicable as prior art with regard to the present disclosure.

SUMMARY

An electronic device of the related art displays a button for displaying an additional execution screen to perform an additional function or configuration in a particular area of a screen where a particular function or an application is executed and displays the additional execution screen according to an input of the displayed button.

However, the related art has a problem in that, when a plurality of additional execution screens are displayed to be overlapped on a display screen, sizes of actually shown application execution screens are reduced.

Further, the related art has a cumbersomeness of performing an input operation many times by the user to display an additional screen.

In addition, in the related art, the user is inconvenienced since available key buttons are limited when a key button included in the electronic device is used, so that various functions cannot be performed.

Aspects of the present disclosure are to address at least the above-mentioned problems and/or disadvantages and to provide at least the advantages described below. Accordingly, an aspect of the present disclosure is to provide an electronic device and a method for controlling an operation of the electronic device to conveniently display an additional execution screen or configuring a function of the electronic device through a floating input.

In accordance with another aspect of the present disclosure, an electronic device performing an operation according to a floating input is provided. The electronic device includes an input unit, a display unit for displaying a user interface, and a controller configured to, when a floating input by the input unit is detected while a first application is being executed, control the first application to perform an operation corresponding to the detected floating input.

In accordance with another aspect of the present disclosure, a method of performing an operation according to a floating input by an electronic device is provided. The method includes determining whether a floating input by an input unit is detected while a first application is being executed, and when the floating input is detected, performing an operation corresponding to the detected floating input.

In various embodiments of the present disclosure, it is possible to increase user convenience by using a display screen as widely as possible and conveniently selecting a menu or calling a function without several controls for selecting the menu or calling the function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an electronic device may be any device including a display unit, and may be referred to as a portable device, a mobile terminal, a communication terminal, a portable communication terminal, a portable and mobile terminal, and the like.

For example, the portable device may be a smart phone, a mobile phone, a game machine, a TeleVision (TV), a display device, a head unit for a vehicle, a notebook computer, a laptop computer, a tablet computer, a Personal Media Player (PMP), a Personal Digital Assistants (PDA) and the like. The electronic device may be implemented as a portable communication terminal which has a wireless communication function and a pocket size. Further, the electronic device may be a flexible display device. In addition, the present disclosure may be applied to all types of devices equipped with an image sensor. Further, such an electronic device may also include a device for a virtual space.

A representative structure of the electronic device refers to a portable phone, and some structural elements of the representative structure of the electronic device may be omitted or modified.

Figure 1:
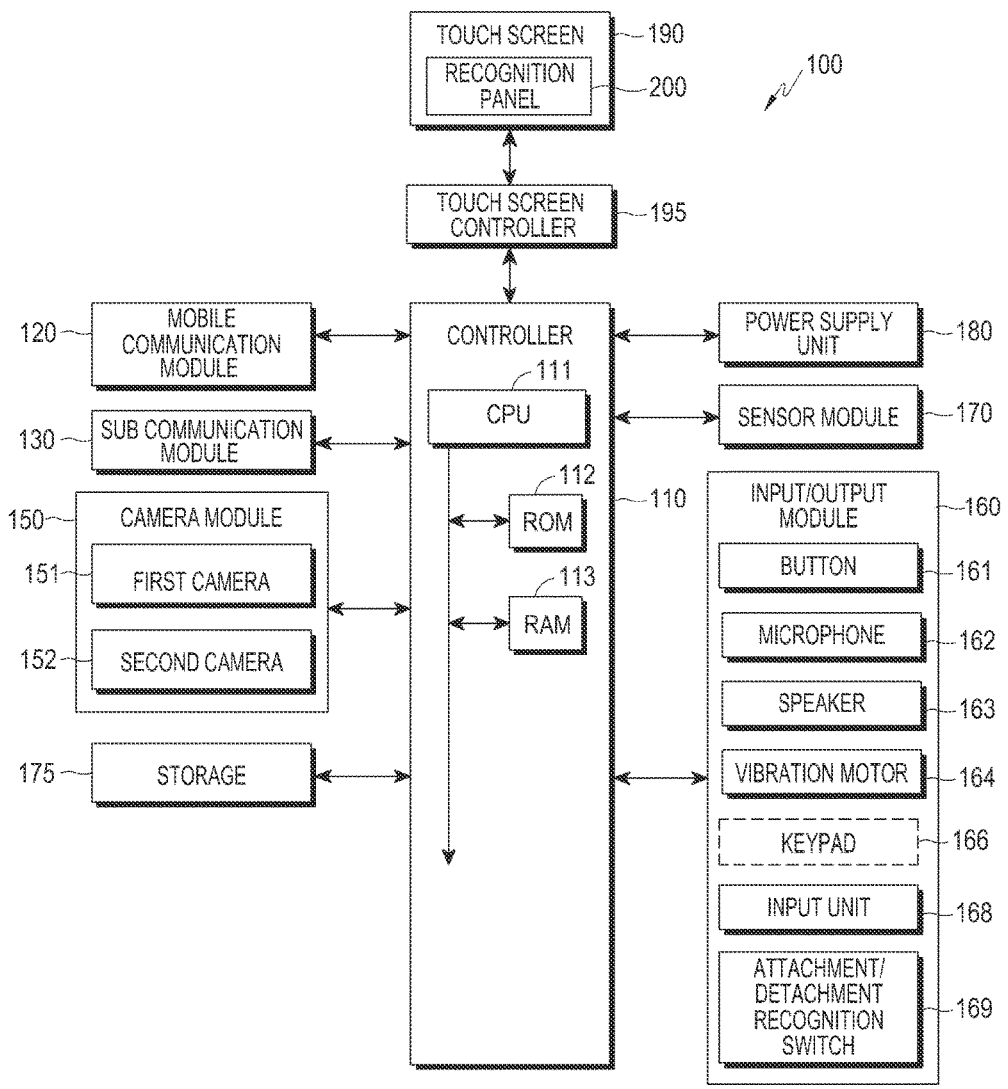
FIG. 1 is a block diagram illustrating a configuration of an electronic device according to an embodiment of the present disclosure.

FIG. 1 is a block diagram illustrating a configuration of an electronic device according to an embodiment of the present disclosure.

Referring to FIG. 1, an electronic device 100 includes a controller 110, a mobile communication module 120, a sub communication module 130, a camera module 150, an input/output module 160, a sensor module 170, a storage unit 175, a power supply unit 180, a touch screen 190, a touch screen controller 195, and a recognition panel 200. The mobile communication module 120 and/or the sub communication module 130 may be referred to as a communication unit.

The sub communication module 130 performs at least one of Wireless Local Area Network (WLAN) communication and short-range communication. The camera module 150 includes at least one of a first camera 151 and a second camera 152, and the input/output module 160 includes at least one of a plurality of buttons 161, a microphone 162, a speaker 163, a vibration motor 164, and a keypad 166. Further, in an embodiment of the present disclosure, the input/output module 160 further includes an input unit 168 and an attachment/detachment recognition switch 169.

The controller 110 may include a bus for information communication and a Central Processing Unit (CPU) 111 connected with the bus for processing information. The CPU 111 may include an Application Processor (AP), a communication processor and the like.

The controller 110 may further include a Random Access Memory (RAM) 113 connected with the bus to temporarily store information used by the CPU 111 and a Read Only Memory (ROM) 112 connected with the bus to store static information used by the CPU 111.

Particularly, the controller 110 may control the mobile communication module 120, the sub communication module 130, the camera module 150, the input/output module 160, the sensor module 170, the storage unit 175, the power supply unit 180, the touch screen 190, the touch screen controller 195, and the recognition panel 200.

In an embodiment of the present disclosure, when a floating input is detected on the screen in which a first application is being executed, the controller 110 controls a user interface corresponding to the floating input. The floating input according to an embodiment of the present disclosure means that, in order to call a function of the electronic device 100, the input unit 168 or a body is detected in a non-contact state for a time preset in a state where the input unit 168 or the body is in contact with the screen, or the input unit 168 or a body is detected in a non-contact state in a floating area corresponding to a distance preset within a remote range in which the input unit 168 or the body is not detected. Further, the floating area corresponding to a preset distance may refer to a predetermined area to display a particular execution screen or call a set function. The particular execution screen refers to a screen configured to execute a particular function and may include, for example, a pen setting screen for setting a pen shape, a pen thickness, and a pen color of a palette application and executing a pen function.

Specifically, the controller 110 determines whether hovering is detected in the floating area of the execution screen for a first application during a preset time. When the hovering is detected for the present time, the controller 110 controls to display an additional execution screen corresponding to the detection of the hovering or calls a function of the electronic device 100.

For example, the controller 110 controls to display an application execution screen on the touch screen 190 according to an execution request for a drawing application. When a touch and drag input made by a contact by a touch input means such as a pen or a finger is detected, the controller 110 may control to display a trace corresponding to the detected touch and drag input on the touch screen 190. Thereafter, when the controller 110 determines whether the hovering is detected in the floating area corresponding to a preset distance from the touch screen 190 for a preset time and detects a hovering event, the controller 110 controls to display an additional execution screen such as a palette setting screen on a particular position of the touch screen 190. When there is no input for the present time, the controller 110 controls to stop displaying the additional execution screen and controls to display the existing application execution screen.

Further, when the controller 110 determines whether a hovering movement is detected in the floating area for a preset time and detects the hovering movement, the controller 110 may move and control to display the additional execution screen according to a detected movement direction. For example, the controller 110 may control to display a different additional execution screen such as a setting screen for inputting a text in the palette setting screen in accordance with the hovering movement.

Further, when the controller 110 detects the hovering in the floating area for a preset time, the controller 110 may set a particular function of the electronic device 100 and perform a function set by an input means. For example, when the controller 110 controls to display a trace corresponding to the detected touch and drag input in the execution screen for the drawing application on the touch screen 190 and then detects the hovering in the floating area during a preset time, the controller 110 may set a particular function of the electronic device 100 such as an eraser function corresponding to the detected hovering and perform the eraser function by an input means.

Further, the controller 110 may select one or more menus displayed on the touch screen 190 by the detection of the hovering. For example, when the hovering is detected in the floating area of a particular menu area displayed on the touch screen 190, the controller 110 may select a particular menu for which a hovering event is detected.

The mobile communication module 120 connects the electronic device 100 with an external device through mobile communication by using one or more antennas (not shown) under a control of the controller 110. The mobile communication module 120 transmits/receives a radio signal for a voice call, a video call, a Short Message Service (SMS), or a Multimedia Message Service (MMS) to/from a mobile phone (not shown), a smart phone (not shown), a tablet Personal Computer (PC), or another device (not shown) having a phone number input into the electronic device 100.

The sub communication module 130 may perform at least one of WLAN communication and short-range communication. For example, the sub communication module 130 may include only a WLAN module (not shown), only a short-range communication module (not shown), or both the WLAN module and the short-range communication module.

According to a control of the controller 110, the WLAN module may be connected to the Internet at a place where a wireless Access Point (AP) (not shown) is installed. The WLAN module supports the IEEE 802.11x WLAN standard of the Institute of American Electrical and Electronics Engineers (IEEE). The short-range communication module may wirelessly perform short distance communication between the electronic device 100 and an image forming apparatus (not shown) according to a control of the controller 110. A short-range communication scheme may include a Bluetooth communication scheme, an Infrared Data Association (IrDA) scheme, a Wi-Fi Direct communication scheme, a Near Field Communication (NFC) scheme, and the like.

The electronic device 100 may include at least one of the mobile communication module 120, the WLAN module, and the short-range communication module. For example, the electronic device 100 may include a combination of the mobile communication module 120, the WLAN module, and the short-range communication module according to the capability thereof.

The camera module 150 may include at least one of the first camera 151 and the second camera 152 which photograph a still image or a moving image according to a control of the controller 110. Further, the first camera 151 or the second camera 152 may include an auxiliary light source (for example, a flash (not shown)) that provides an amount of light used for photographing. The first camera 151 may be disposed on a front surface of the electronic device 100, and the second camera 152 may be disposed on a rear surface of the electronic device 100. Alternatively, the first camera 151 and the second camera 152 are closely located to each other and photograph a three dimensional still image or a three dimensional video.

The input/output module 160 may include at least one of a plurality of buttons 161, the microphone 162, the speaker 163, the vibration motor 164, the connector 165, and the keypad 166.

The at least one of the plurality of buttons 161 may be disposed on a front surface, a side surface or a rear surface of a housing of the electronic device 100, and may include at least one of an electric power/lock button (not shown), a volume control button (not shown), a menu button, a home button, a back button, and a search button.

The microphone 162 receives a voice or a sound to generate an electrical signal under a control of the controller 110.

The speaker 163 may output sounds corresponding to various signals (for example, a wireless signal, a broadcasting signal, a digital audio file, a digital video file, photographing or the like) of the mobile communication module 120, the sub-communication module 130, or the camera module 150 to the outside of the electronic device 100 under a control of the controller 110. The speaker 163 may output sounds (for example, a button operation sound or a ringtone corresponding to a voice call) corresponding to functions which the electronic device 100 performs. One or more speakers 163 may be disposed at an appropriate position or appropriate positions of the housing of the electronic device 100.

The vibration motor 164 may convert an electrical signal into a mechanical vibration under a control of the controller 110. For example, when the electronic device 100 in a vibration mode receives a voice call from another device (not shown), the vibration motor 164 is operated. One or more vibration motors 164 may be formed within the housing of the electronic device 100. The vibration motor 164 may operate in response to a touch operation of a user who touches the touch screen 190, and a continuous movement of a touch on the touch screen 190.

The keypad 166 may receive a key input from a user for a control of the electronic device 100. The keypad 166 includes a physical keypad (not shown) formed in the electronic device 100 or a virtual keypad (not shown) displayed on the touch screen 190. The physical keypad (not shown) formed on the electronic device 100 may be excluded according to the performance or structure of the electronic device 100.

The input unit 168 may be inserted into the electronic device 100 to be stored in the electronic device 100, and withdrawn and detached from the electronic device 100 when being used. At this time, the input unit 168 may be a stylus pen.

The attachment/detachment recognition switch 169 operating in accordance with attachment or detachment of the input unit 168 is located in one area within the electronic device 100 into which the input unit 168 is inserted, and thus may provide signals corresponding to the attachment and the detachment of the input unit 168 to the controller 110.

The attachment/detachment recognition switch 169 is located at one area into which the input unit 168 is inserted to directly or indirectly contact the input unit 168 when the input unit 168 is mounted. Accordingly, the attachment/detachment recognition switch 169 generates a signal corresponding to the attachment or the detachment of the input unit 168 based on the direct or indirect contact with the input unit 168 and then provides the generated signal to the controller 110.

When the input unit 168 approaches the recognition panel 200 of the electronic device 100 to be within a predetermined range, a hovering event may be generated in a predetermined position of the recognition panel 200 by a magnetic field due to a coil within the input unit 168. To this end, the electronic device 100 may perform an operation for scanning for the magnetic field formed on the recognition panel 200 continuously or periodically.

Further, a button located in the input unit 168 may be pressed by the user. As the button is pressed, a particular signal value may be generated by the input unit 168 and transmitted to the recognition panel 200. To this end, a particular capacitor, an additional coil, or a particular device which may make a change in electrostatic induction may be located in an adjacent area of the button. As the attachment/detachment recognition switch 169 is touched or pressed, the corresponding device is connected to the coil, an electrostatic induction value induced in the recognition panel 200 is changed, and then the pressing of the button of the input unit 168 may be recognized. Alternatively, a wireless signal corresponding to the pressing of the button may be generated and the generated wireless signal may be transmitted to a receiver prepared in a separated area of the electronic device 100. Then, the electronic device 100 may recognize the pressing of the button of the input unit 168 according to the received wireless signal. Further, the input unit 168 may generate a plurality of different resonant frequencies according to a unit state of the input unit 168 and recognize a resonant frequency on the recognition panel 200 that matches the resonant frequency generated in the input unit 168, so as to determine a unit state such as a touch or hovering.

The sensor module 170 includes at least one sensor for detecting a state of the electronic device 100. For example, the sensor module 170 may include a proximity sensor for detecting whether a user comes close to the electronic device 100, an illuminance sensor (not shown) for detecting an amount of ambient light of the electronic device 100, a motion sensor (not shown) for detecting a movement of the electronic device 100, (for example, a rotation of the electronic device 100, and acceleration or vibration applied to the electronic device 100), a geo-magnetic sensor (not shown) for detecting a point of the compass by using a magnetic field of the Earth, a gravity sensor for detecting an action direction of the gravity, and an altimeter for detecting altitude by measuring atmospheric pressure. At least one sensor may detect a state of the electronic device 100, generate a signal corresponding to the detection, and transmit the generated signal to the controller 110. The sensors of the sensor module 170 may be added or omitted according to the performance of the electronic device 100.

The storage unit 175 may store signals or data input/output in response to the operations of the mobile communication module 120, the sub communication module 130, the camera module 150, the input/output module 160, the sensor module 170, and the touch screen 190 according to a control of the controller 110. The storage unit 175 may store a control program and applications for controlling the electronic device 100 or the controller 110.

The term "storage unit" may include the storage unit 175, the ROM 112 and the RAM 113 in the control unit 110, or a memory card (not shown) (for example, a Secure Digital (SD) card or a memory stick) mounted in the electronic device 100. The storage unit may include a non-volatile memory, a volatile memory, a Hard Disk Drive (HDD), and a Solid State Drive (SSD).

The power supply unit 180 may supply power to one or more batteries (not shown) disposed in the housing of the electronic device 100 under a control of the controller 110. One or more batteries (not shown) supply power to the electronic device 100. Further, the power supply unit 180 may supply the electronic device 100 with power input from an external power source (not shown) through a wired cable connected to the connector 165. In addition, the power supply unit 180 may supply the electronic device 100 with power wirelessly input from the external power source by using a wireless charging technology.

The touch screen 190 may provide a user with a user interface corresponding to various services (for example, a voice call, data transmission, broadcasting, and photographing). The touch screen 190 may transmit an analog signal corresponding to at least one touch, which is input to the User Interface (UI), to the touch screen controller 195. The touch screen 190 may receive at least one touch through a user's body part (for example, fingers including a thumb) or a touch input means (for example, a stylus pen). Further, the touch screen 190 may receive a continuous movement of one touch among the at least one touch. The touch screen 190 may transmit an analog signal corresponding to a continuous movement of an input touch to the touch screen controller 195.

In addition, the touch is not limited to a touch between the touch screen 190 and a user's body or a touch means, but includes a non-contact (for example, a case where an interval between the touch screen 190 and the user's body or the touch means is 1 mm or shorter). The detectable interval on the touch screen 190 may be changed according to the performance or structure of the electronic device 100. Particularly, the touch screen 190 may output different values (for example, including current values) detected by a touch event and a hovering event so that the touch event by a contact with the user's body or the touch input unit and the input event (for example, the hovering event) in a noncontact state can be distinguishably detected. Further, it is preferable that the touch screen 190 outputs different values (for example, current values or the like) detected according to a distance between an area where the hovering event is generated and the touch screen 190.

In an embodiment of the present disclosure, when a hovering event is generated in an area corresponding to a preset distance, the touch screen 190 may display a value detected by the generated hovering event on an additional execution screen or output the value as a value for setting a function of the electronic device 100.

The touch screen 190, for example, may be implemented in a resistive type, a capacitive type, an infrared type, or an acoustic wave type.

Meanwhile, the touch screen controller 195 converts analog signals received from the touch screen 190 into digital signals (for example, X and Y coordinates) and transmits the digital signals to the controller 110. The controller 110 may control the touch screen 190 by using the digital signal received from the touch screen controller 195. For example, the controller 110 enables a shortcut icon (not shown) displayed on the touch screen 190 to be selected or executed in response to a touch event or a hovering event. Further, the touch screen controller 195 may be included in the controller 110.

Furthermore, the touch screen controller 195 may identify a distance between a space where the hovering event is generated and the touch screen 190 by detecting a value (for example, a current value or the like) output through the touch screen 190, convert the identified distance value to a digital signal (for example, a Z coordinate), and then provide the converted digital signal to the controller 110.

Further, the touch screen 190 may include at least two touch screen panels which detect a touch or an approach of a user's body part or a touch input means in order to simultaneously receive inputs of the user's body part and the touchable input means. The at least two touch screen panels provide different output values to the touch screen controller 195, and the touch screen controller 195 differently recognizes the values input from the at least two touch screen panels to determine whether the input from the touch screen is an input from the user's body part or an input from the touchable input means.

Figure 2:
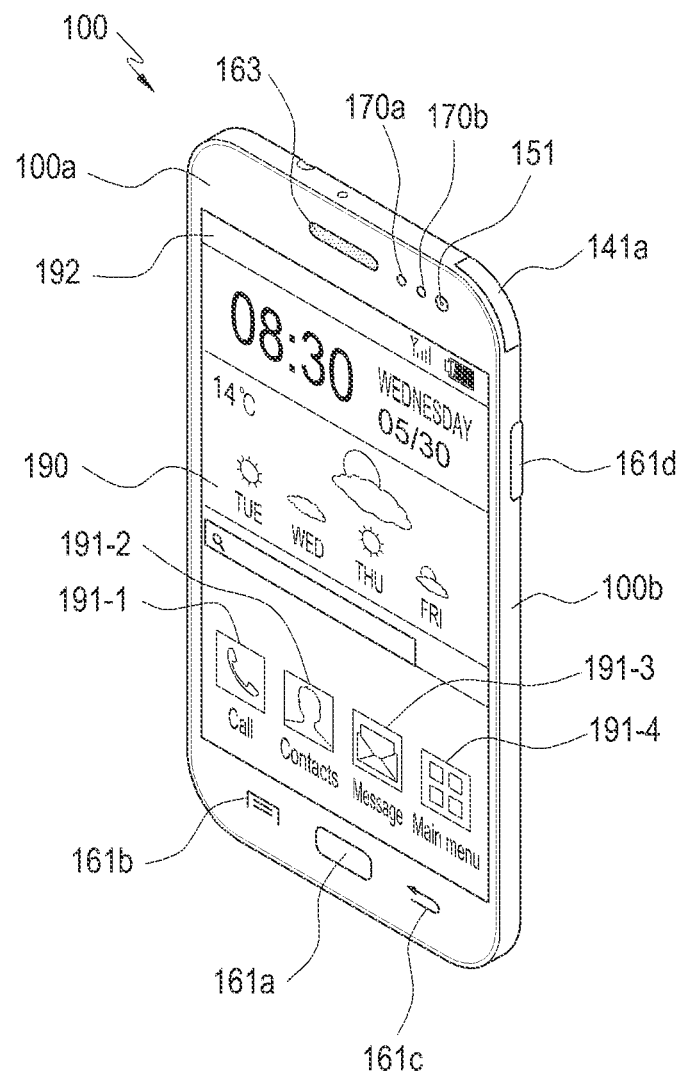
FIG. 2 is a front perspective view of an electronic device according to an embodiment of the present disclosure.
Figure 3:
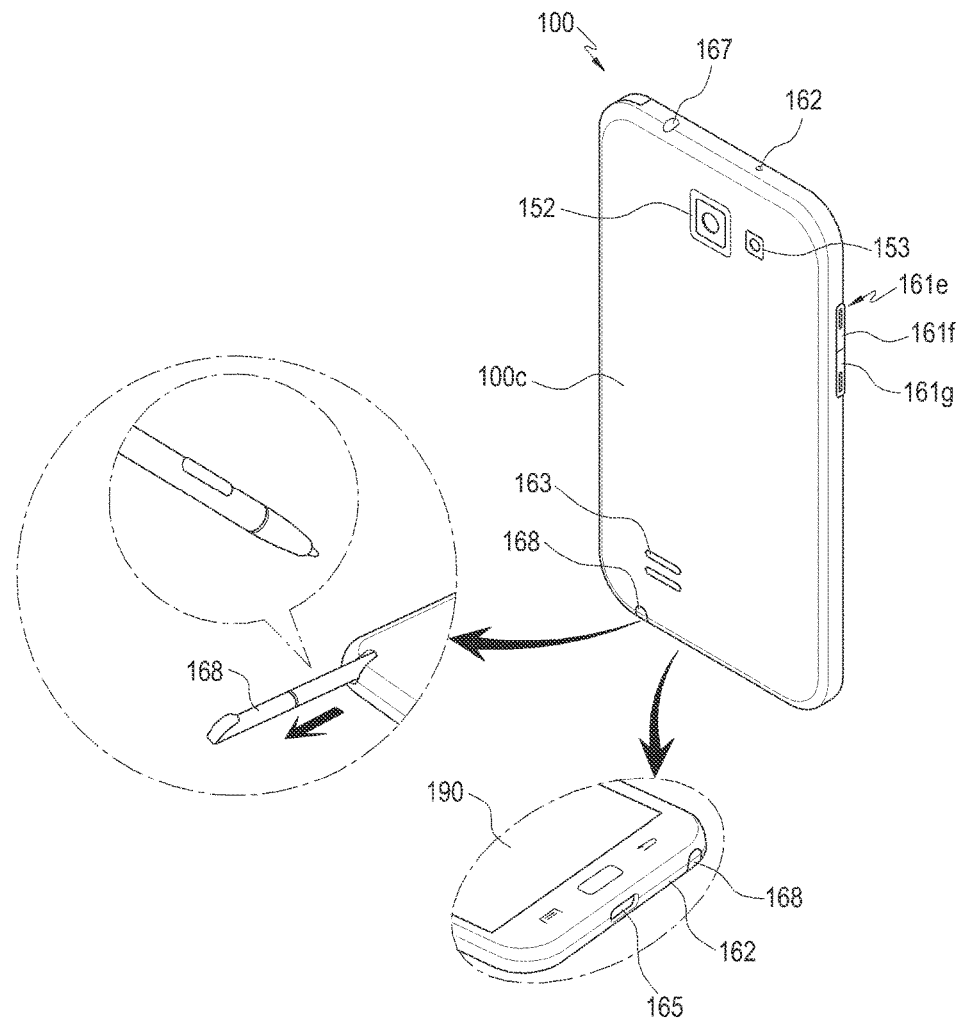
FIG. 3 is a rear perspective view of an electronic device according to an embodiment of the present disclosure.

FIG. 2 is a front perspective view of the electronic device according to an embodiment of the present disclosure, and FIG. 3 is a rear perspective view of the electronic device according to an embodiment of the present disclosure.

Referring to FIG. 2, the touch screen 190 is arranged at the center of a front surface 100a of the electronic device 100. The touch screen 190 has a large size to cover most of the front surface 100a of the electronic device 100. FIG. 2 shows an example in which a main home screen is displayed on the touch screen 190. The main home screen is a first screen displayed on the touch screen 190 when the electronic device 100 is turned on. Further, when the electronic device 100 has different home screens of several pages, the main home screen may be a first home screen of the home screens of several pages. Shortcut icons 191-1, 191-2, and 191-3 for executing frequently used applications, a main menu switching key 191-4, time, weather, and the like may be displayed on the home screen. The main menu switching key 191-4 displays a menu screen on the touch screen 190. On an upper end of the touch screen 190, a status bar 192 may be formed that indicates a status of the electronic device 100 such as a battery charging status, intensity of a received signal and current time.

On a lower part of the touch screen 190, a home button 161a, a menu button 161b, and a back button 161c may be formed.

The home button 161a displays the main home screen on the touch screen 190. For example, when the home button 161a is pressed in a state where any home screen different from the main home screen or the menu screen is displayed on the touch screen 190, the main home screen may be displayed on the touch screen 190. Further, when the home button 191a is touched while applications are executed on the touch screen 190, the main home screen shown in FIG. 2 may be displayed on the touch screen 190. In addition, the home button 161a may be used to display recently used applications or a task manager on the touch screen 190.

The menu button 161b provides a connection menu which can be used on the touch screen 190. The connection menu may include a widget addition menu, a background image changing menu, a search menu, an editing menu, an environment setting menu, and the like.

The back button 161c may display the screen which was executed just before the currently executed screen or may terminate the most recently used application.

A power/reset button 161d may turn on/off power of the electronic device 100 or switch a state of the electronic device 100 from an inactive data to an active state. At this time, the inactive state may be a state in which only minimum necessary components within the electronic device 100 are driven with minimum power and the remaining components are turned off or a Liquid Crystal Display (LCD) screen is turned off.

The first camera 151, an illumination sensor 170a, and a proximity sensor 170b may be disposed at an edge of the front surface 100a of the electronic device 100. The second camera 152, the flash 153, and the speaker 163 may be disposed on a rear surface 100c of the electronic device 100.

The electronic device 100 has an power/lock button 161d, a volume control button 161e including a volume increasing button 161f and a volume reducing button 161g, a Digital Multimedia Broadcasting (DMB) antenna 141a for receiving a broadcast, one or more microphones 162 and the like located at a side surface 100b. The DMB antenna 141a may be fixed to the electronic device 100, or may be formed detachably from the electronic device 100.

Further, the connector 165 may be formed on a lower side surface of the electronic device 100. A plurality of electrodes may be formed in the connector 165, and the connector 165 may be connected to an external device through a wired cable. An earphone connecting jack 167 may be formed on an upper side surface of the electronic device 100. Earphones may be inserted into the earphone connecting jack 167.

Further, a stylus pen corresponding to the input unit 168 may be formed on a lower side surface of the electronic device 100. The stylus pen may be inserted into the electronic device 100 to be stored in the electronic device 100, and withdrawn and detached from the electronic device 100 when being used. The stylus pen may include a button.

Figure 4:
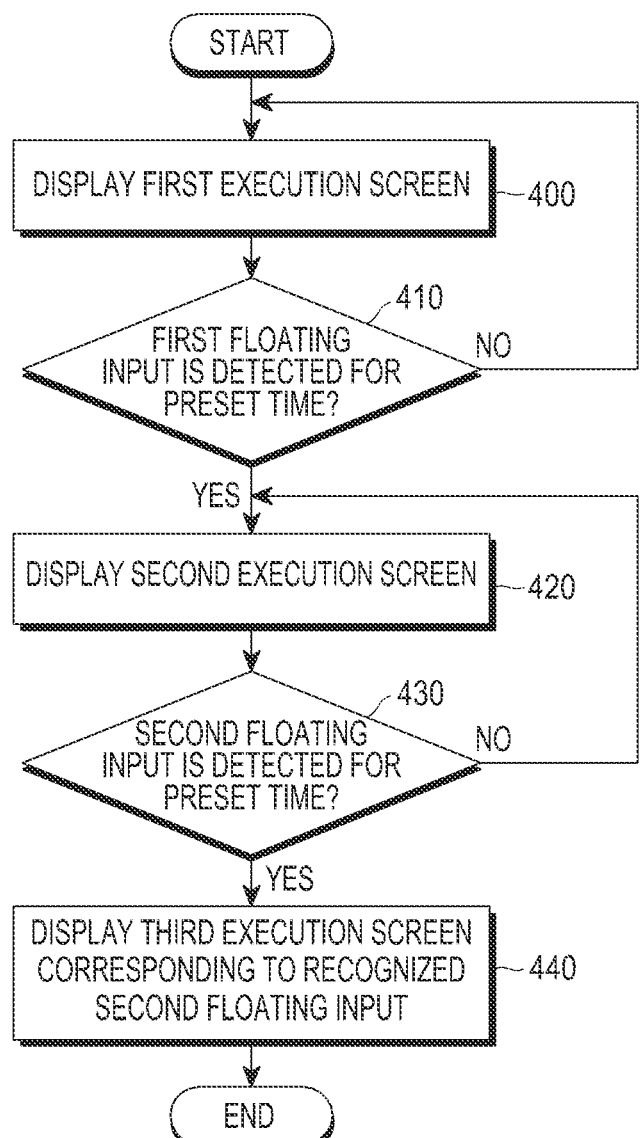
FIG. 4 is a flowchart illustrating a process in which an electronic device detects a floating input and displays an additional execution screen according to an embodiment of the present disclosure.

FIG. 4 is a flowchart illustrating a process in which an electronic device detects a floating input and displays an additional execution screen according to an embodiment of the present disclosure.

Referring to FIG. 4, the controller 110 controls to display a first execution screen in operation 400. Specifically, the controller 110 may execute a first application according to a first application execution request and control to display a corresponding execution screen on the touch screen 190.

The controller 110 determines whether a first floating input is detected for a preset time in operation 410. The controller 110 proceeds to operation 420 when the first floating input is detected, and controls to display the first execution screen in operation 400 when the first floating input is not detected. The first floating input may be a touch and drag input.

In operation 420, the controller 110 controls to display a second execution screen to correspond to the first floating input. Specifically, the controller 110 controls to display the additional execution screen configured to correspond to the floating input on the application execution screen on a particular position of the touch screen 190 in a popup window form.

The controller 110 determines whether the second floating input is detected in a floating area corresponding to a preset distance from the touch screen 190 in operation 430. The controller 110 proceeds to operation 440 when the second floating input is detected, and controls to display the second execution screen in operation 420 when the second floating input is not detected. The second floating input may be a hovering event.

In operation 440, the controller 110 controls to display a third execution screen corresponding to the recognized second floating input on the touch screen 190.

Through the same process as that described above, execution screens corresponding to preset third floating input and fourth floating input may be displayed on the touch screen 190.

For example, when a hovering event is generated in a floating area corresponding to a preset distance from the touch screen 190 in a state where a drawing application execution screen which is the first execution screen is displayed, the controller 110 may control to display a pen setting screen which is the second execution screen corresponding to the generated hovering event.

Thereafter, when a hovering movement event is detected in the floating area corresponding to a preset distance from the touch screen 190, the controller 110 may change the screen to a color setting screen which is the third execution screen corresponding to the detected hovering movement event and control to display the color setting screen. The hovering movement event may denote a horizontal movement from a first position to a second position or a vertical movement from a third position to a fourth position in a non-contact state.

In another embodiment, when a hovering event is detected in a first floating area corresponding to a preset first distance in a state where a first execution screen is displayed, the controller 110 may control to display a second execution screen. When the hovering event is detected in a second floating area corresponding to a preset second distance, the controller 110 may control to display a third execution screen.

Further, in the present disclosure, when the hovering event is generated, an execution screen can be displayed according to a position where the hovering is generated. For example, when a game application is executed and a hovering event is detected in an area corresponding to a preset distance from an area in which a first game character is displayed, the controller 110 may control to display an additional execution screen such that the additional execution screen such as a character setting screen overlaps the first game character area. Further, when a hovering event is detected in an area corresponding to a preset distance from an area in which a second game character is displayed, the controller 110 may control to display a character setting screen such that the character setting screen overlaps the second game character area.

Figure 5:
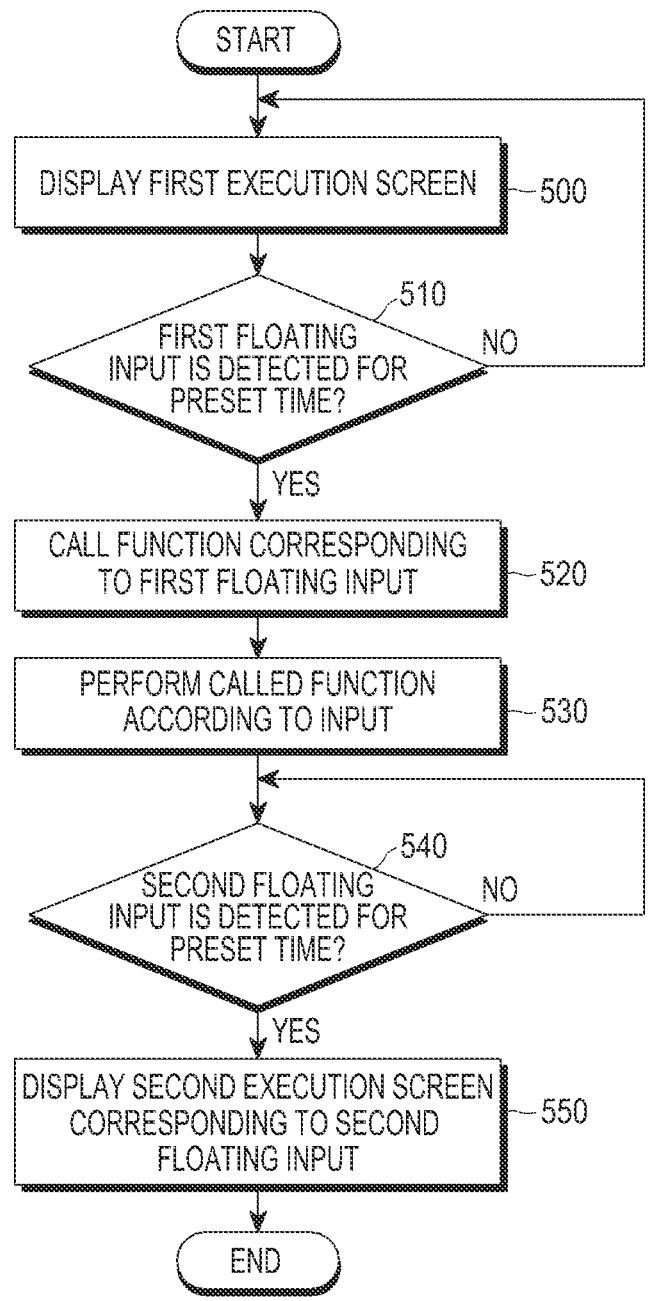
FIG. 5 is a flowchart illustrating a process in which an electronic device detects a floating input and configures a device function according to an embodiment of the present disclosure.

FIG. 5 is a flowchart illustrating a process in which an electronic device detects a floating input and configures a device function according to an embodiment of the present disclosure.

Referring to FIG. 5, the controller 110 controls to display a first execution screen in operation 500. Specifically, the controller 110 may execute a first application according to a first application execution request and control to display a corresponding execution screen on the touch screen 190.

The controller 110 determines whether a first floating input is detected for a preset time in operation 510. The controller 110 proceeds to operation 520 when the first floating input is detected, and controls to display the first execution screen in operation 500 when the first floating input is not detected.

In operation 520, the controller 110 calls a function corresponding to the first floating input. For example, when a hovering event is detected in an area corresponding to a preset distance from the touch screen 190 in a state where a drawing application execution screen is displayed, the controller 110 may call an eraser function corresponding to the detected hovering event.

In operation 530, the controller 110 performs the called function according to an input by an input means. For example, when a touch input for executing the called eraser function is received, the controller 110 may perform the eraser function in response to the received touch input. In other words, the controller 110 deletes an area corresponding to the received touch input.

The controller 110 determines whether a second floating input is detected for a preset time in operation 540. The controller 110 proceeds to operation 550 when the second floating input is detected, and identifies whether the second floating input is detected for a preset time in operation 540 when the second floating input is not detected.

In operation 550, the controller 110 calls a function corresponding to the second floating input. For example, when the second floating input is detected in a state where the eraser function is called as the function corresponding to the first floating input in operation 530, the controller 110 may change the type of pen to a water color point brush from a pencil. At this time, a drawing drawn on the first execution screen is changed to a drawing drawn by a water color paint brush, not a pencil.

In an embodiment of the present disclosure, according to a range of pre-designated floating areas, functions corresponding to a third floating input and a fourth floating input may be assigned. For example, the controller 110 may configure a first function in a third floating area corresponding to a preset third distance from the touch screen 190 and a second function in a fourth floating area corresponding to a preset forth distance from the touch screen 190. When the third floating input is detected in the third floating area, the controller 110 may call the first function corresponding to the third floating area. When the fourth floating input is detected in the fourth floating area, the controller 110 may call the second function corresponding to the fourth floating area.

Further, in an embodiment of the present disclosure, displaying an execution screen and calling a function may be alternately configured according to preset floating areas. For example, an eraser function may be configured in the first floating area and a palette screen may be displayed on the second floating area. Thereafter, the controller 110 may call the eraser function when a floating input is detected in the first floating area, and control to display the palette screen when the floating input is detected in the second floating area.

FIGS. 6A to 9 are examples for describing a process in which an electronic device detects a floating input and displays an additional execution screen according to an embodiment of the present disclosure.

Figure 6A:
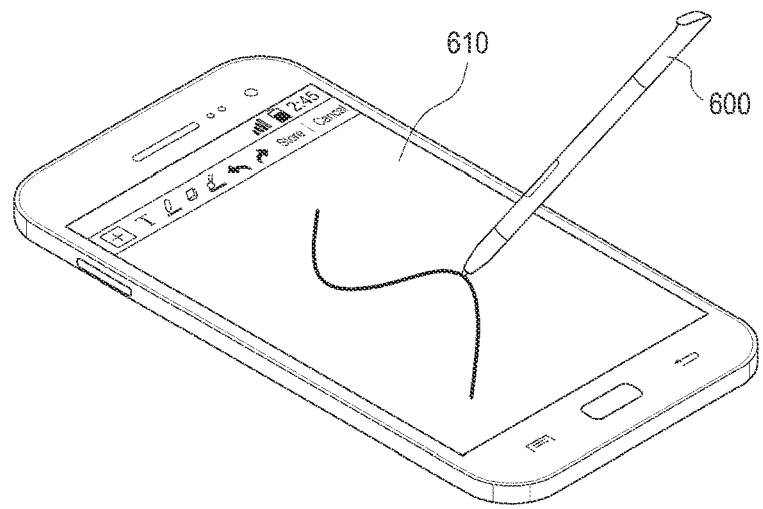
FIGS. 6A, 6B, and 7 are examples for describing a process in which an electronic device detects a floating input and displays an additional execution screen according to an embodiment of the present disclosure.

As illustrated in FIG. 6A, when a touch input of the input unit 168 such as a stylus pen 600 is received by a touch screen 610 of the electronic device 100, the controller 110 outputs generated trace data according to the received touch input.

Figure 6B:
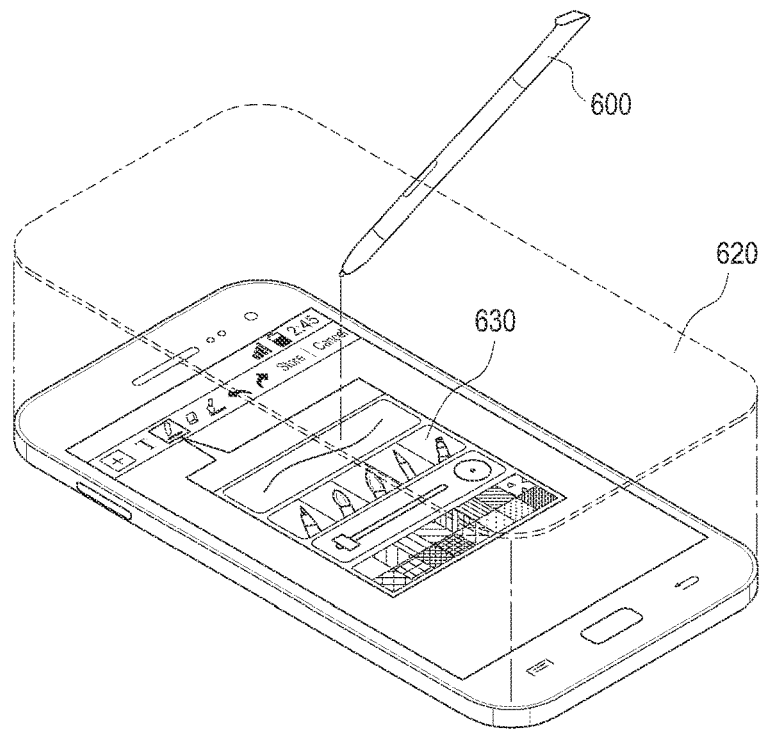

Thereafter, as illustrated in FIG. 6B, when a hovering event by the stylus pen 600 is detected in a floating area 620 corresponding to a preset distance from the touch screen 610, the controller 110 controls to display a pen setting screen 630 corresponding to the detected hovering event on a particular position of the touch screen 190.

Figure 7:
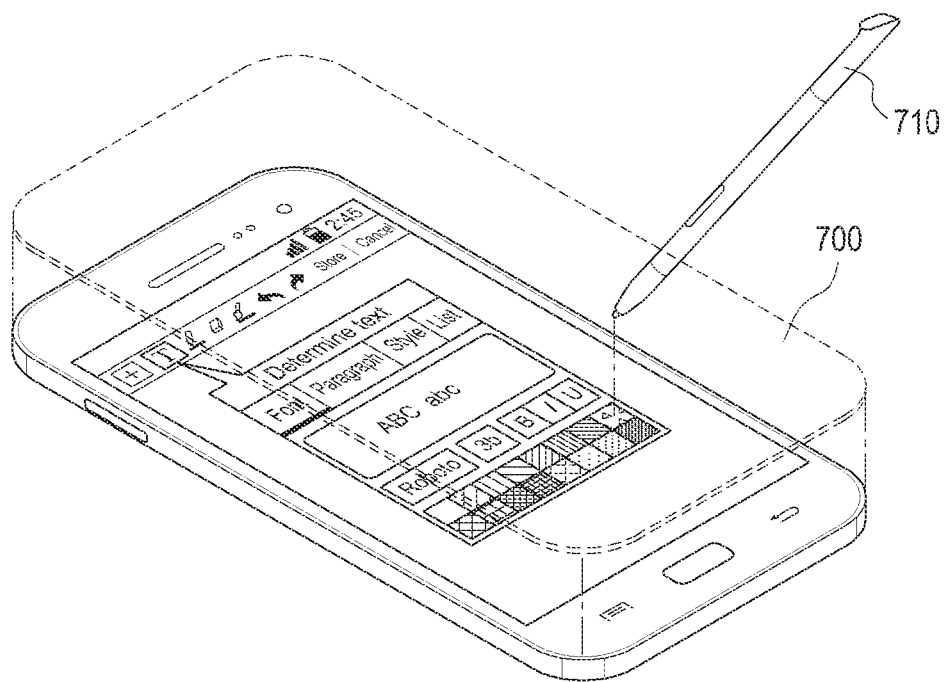

As illustrated in FIG. 7, when the stylus pen 600 is detected in a floating area 700 corresponding to a preset distance from the touch screen, the controller 110 controls to display a text setting screen on the touch screen.

Figure 8:
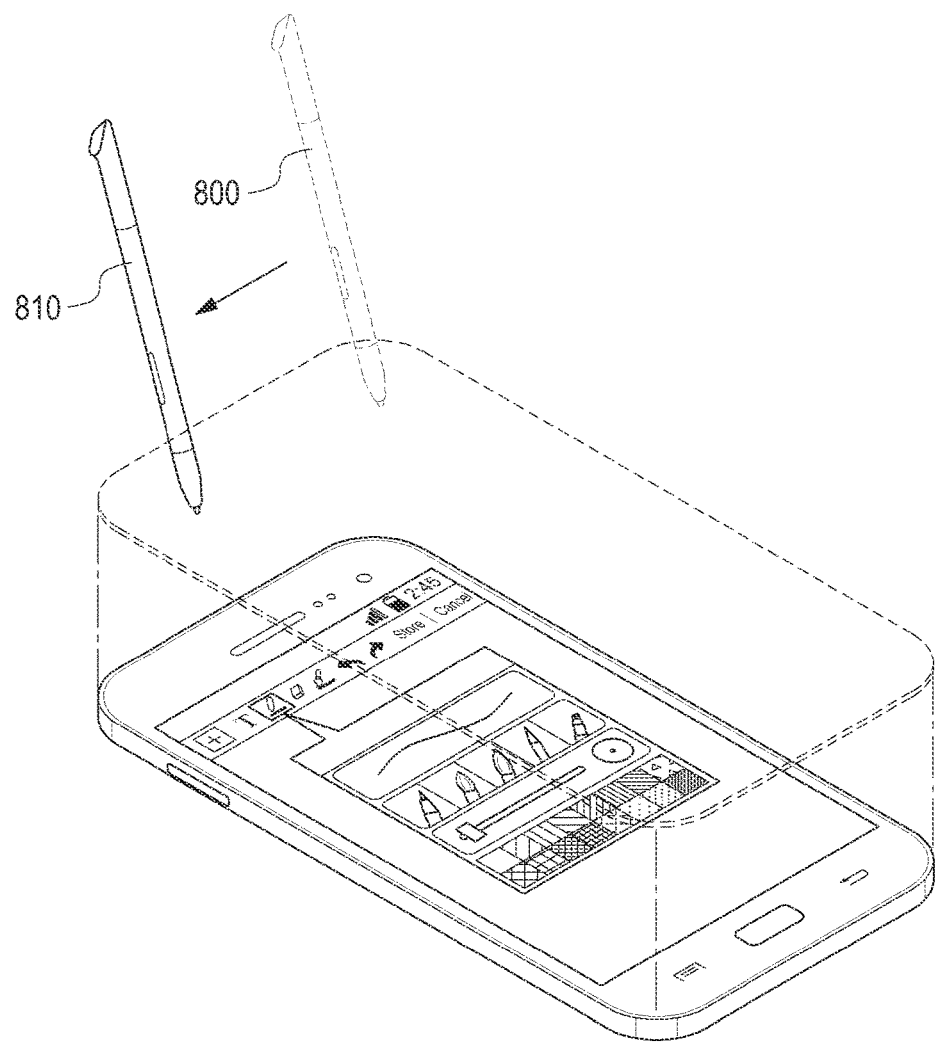
FIG. 8 is an example for describing a process in which an electronic device detects a floating input and configures an additional execution function according to an embodiment of the present disclosure.

Thereafter, as illustrated in FIG. 8, when a movement of the stylus pen 710 from a position 800 to a position 810 is detected in the floating area 700, the controller 110 may control to switch the text setting screen displayed on the particular position of the touch screen to a pen setting screen configured to correspond to a movement direction of the stylus pen 710 and control to display the switched pen setting screen.

Figure 9:
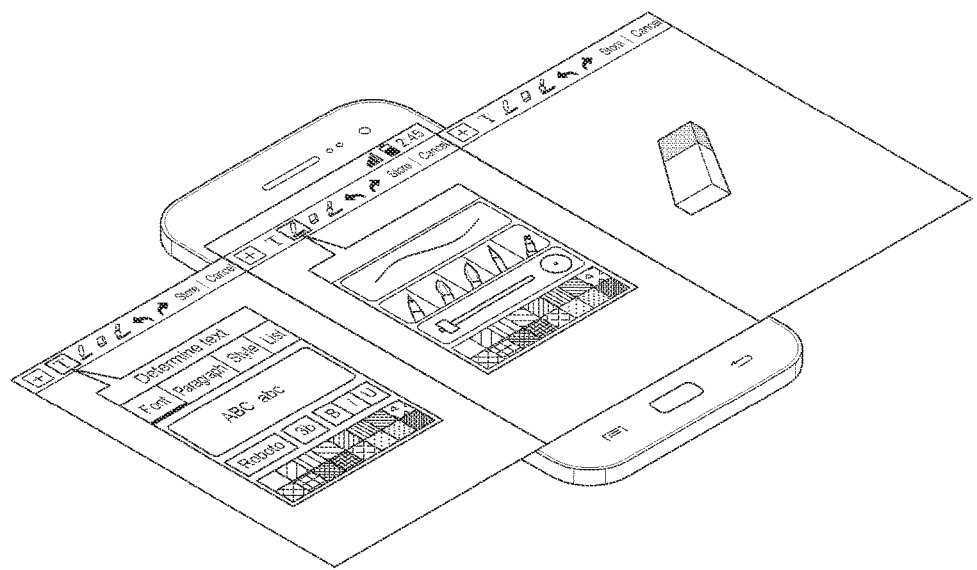
FIG. 9 is an example for describing a process in which an electronic device detects a floating input based on a height according to an embodiment of the present disclosure.

In other words, in an embodiment of the present disclosure, as execution screens of FIG. 9 are virtually arranged, switching to configured execution screens may be made according to a horizontal movement direction of the stylus pen.

Figure 10A:
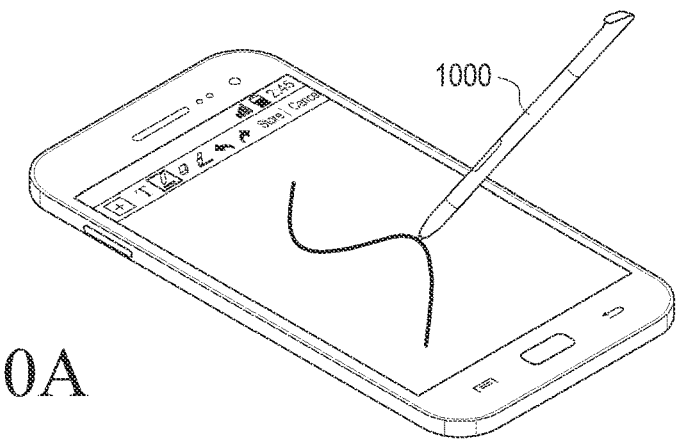
FIGS. 10A, 10B, 10C, and 11 are examples for describing operations of an electronic device corresponding to floating inputs according to an embodiment of the present disclosure.
Figure 10B:
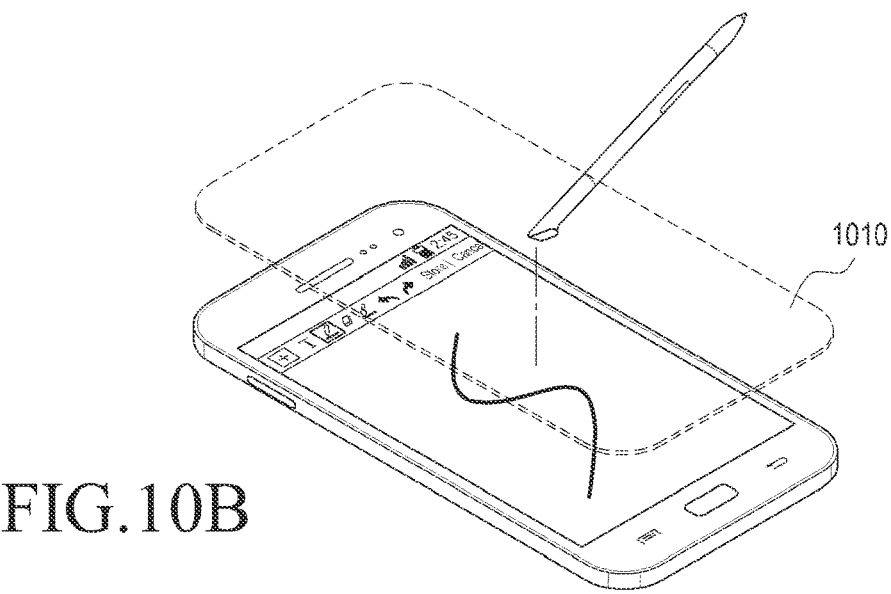
Figure 10C:
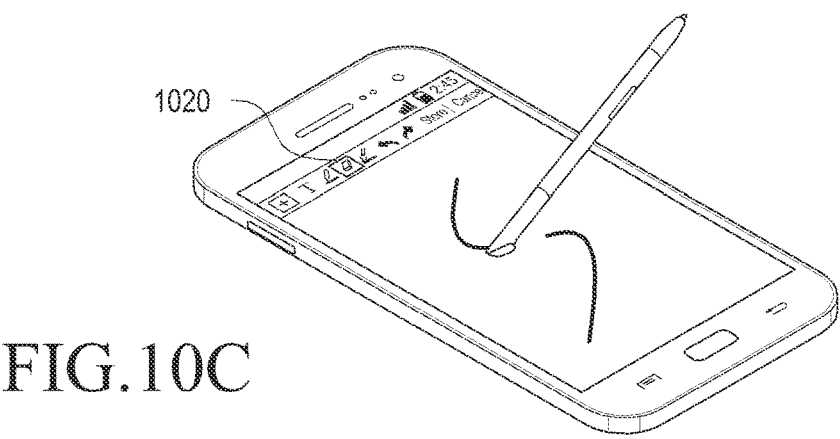

FIGS. 10A to 10C are examples for describing a process in which an electronic device detects a floating input and calling an additional execution function according to an embodiment of the present disclosure.

As illustrated in FIG. 10A, when a touch input of the input unit 168 such as a stylus pen 1000 is received by a touch screen of the electronic device 100 through a pen input function, the controller 110 outputs generated trace data according to the received touch input.

As illustrated in FIG. 10B, when a hovering event by the stylus pen 1000 is detected in a floating area 1010 corresponding to a preset distance from the touch screen for a preset time when the stylus pen 1000 is in a non-contact state, the controller 110 calls an eraser function corresponding to the detected hovering event.

In other words, as illustrated in FIG. 10C, when a touch input of the stylus pen 1000 is received on the output trace data, the controller 110 may delete the trace data corresponding to the touch input by the called eraser function while activating an eraser function icon 1020.

Figure 11:
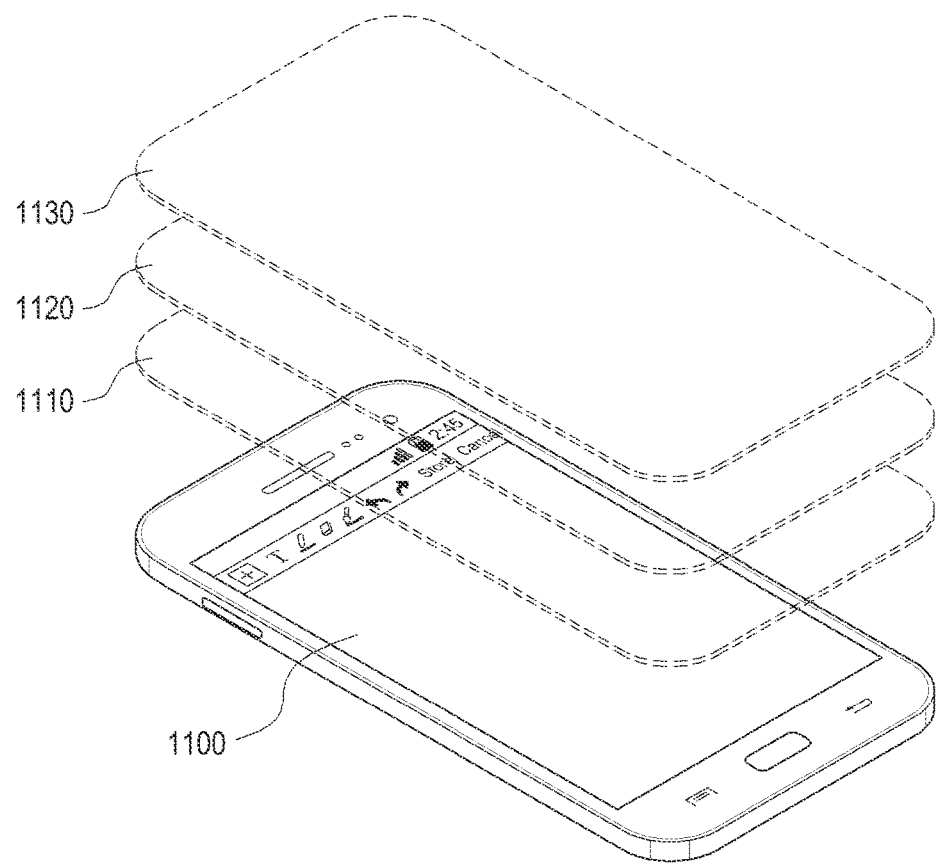

FIG. 11 is an example for describing a process in which an electronic device detects a floating input and calling an additional execution function according to an embodiment of the present disclosure.

Referring to FIG. 11, the controller 110 may configure a first floating area 1110 corresponding to a preset first distance from a touch screen 1100, a second floating area 1120 corresponding to a preset second distance from the touch screen 1100, and a third floating area 1130 corresponding to a preset third distance from the touch screen 1100 as detection areas for displaying additional execution screens or detection areas for calling functions of the electronic device 100.

FIGS. 12A to 14B are examples for describing a process in which an electronic device performs operations of the electronic device corresponding to floating inputs according to an embodiment of the present disclosure.

Particularly, FIGS. 12A to 14B illustrate examples of a useful floating input scheme when heights of floating areas are not distinguished.

Figure 12A:
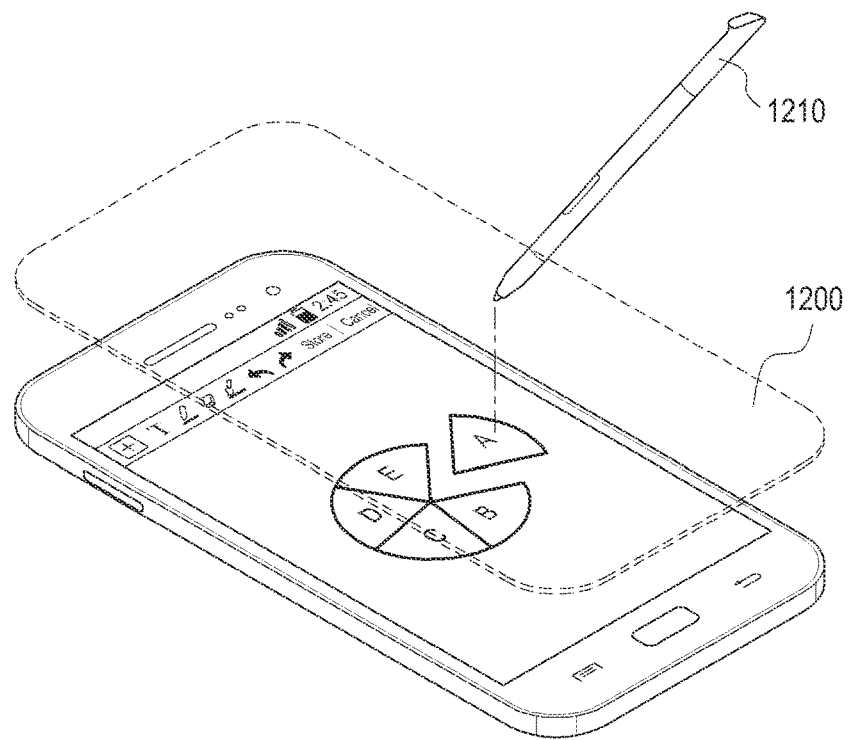
FIGS. 12A, 12B, 13A, 13B, 13C, 14A, and 14B are examples for describing a process in which an electronic device performs operations of the electronic device corresponding to floating inputs according to an embodiment of the present disclosure.
Figure 12B:
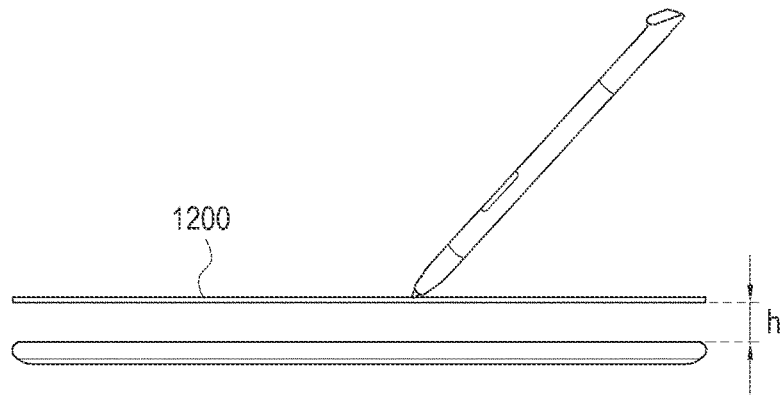

Referring to FIG. 12A, when a floating input by a stylus pen 1210 is detected for a preset time in a floating area 1200 corresponding to a preset distance from the touch screen, the controller 110 controls to display a circular menu according to the detected floating input. At this time, the floating input refers to the detection of an input means such as a non-contact pen or finger in the floating area 1200 spaced apart from the touch screen by a preset distance (h) as illustrated in FIG. 12B.

When the circular menu is selected, the controller 110 is allowed to move or select the menu according to a movement direction of the input means in a non-contact area. Even in a device which does not have a height detection sensor, a menu control is possible through the detection of contact or non-contact alone.

Figure 13A:
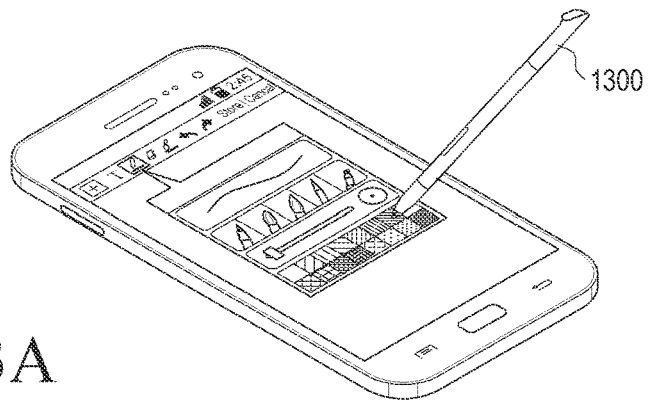
Figure 13B:
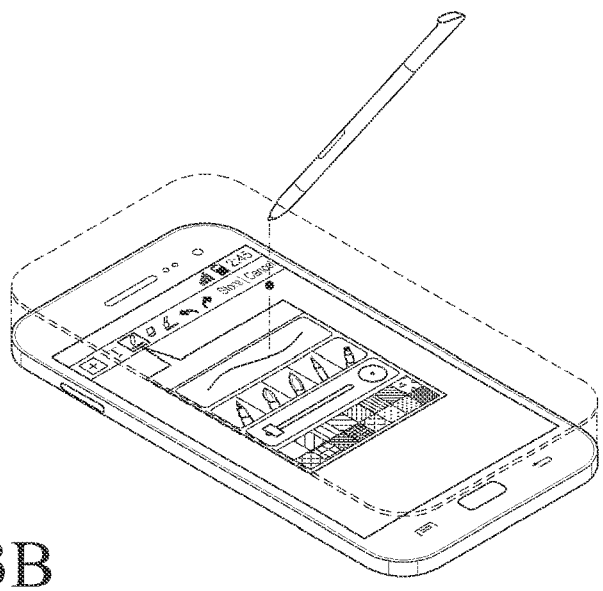
Figure 13C:
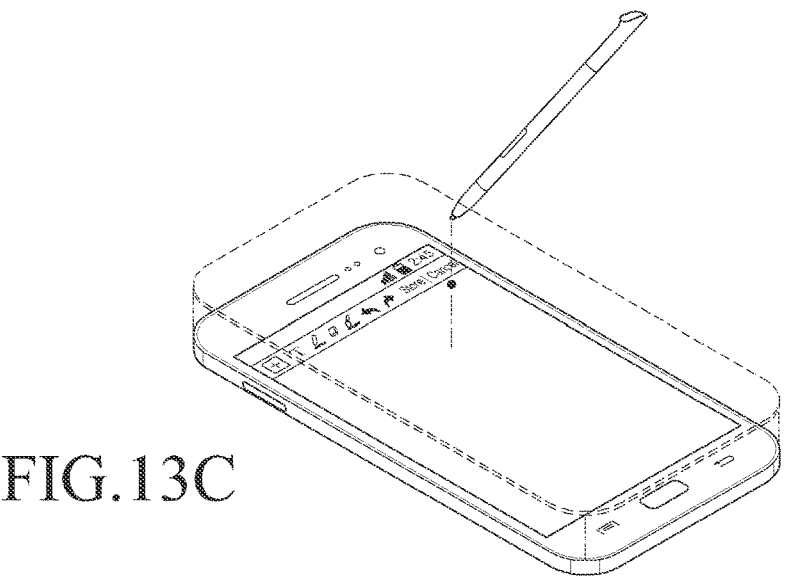

FIGS. 13A to 13C illustrate a floating input by a contact of the touch screen according to an embodiment of the present disclosure.

Referring to FIGS. 13A to 13C, the controller 110 may configure a pen thickness, a pen type, and a pen color as a stylus pen 1300 contacts the touch screen in a state where a pen setting screen is displayed as illustrated in FIG. 13A. Thereafter, as illustrated in FIG. 13B, when an interval between the touch screen and the stylus pen 1300 is longer by a preset distance or more for a predetermined time, the controller 110 may return an application screen to an initial screen as illustrated in FIG. 13C. In other words, when an interval between the touch screen and the stylus pen 1300 becomes a distance beyond the floating area in which the floating touch is detected for a predetermined time, the controller 110 may return the application screen to the initial screen. At this time, in an embodiment of the present disclosure, even when areas other than the pen setting screen are touched on the touch screen, the screen may return to the initial screen of the application as illustrated in FIG. 13C. Through such an operation, it is possible to minimize the confusion from the touch input and to control a menu by the detection of contact or non-contact of menus alone such as the circular menu.

Figure 14A:
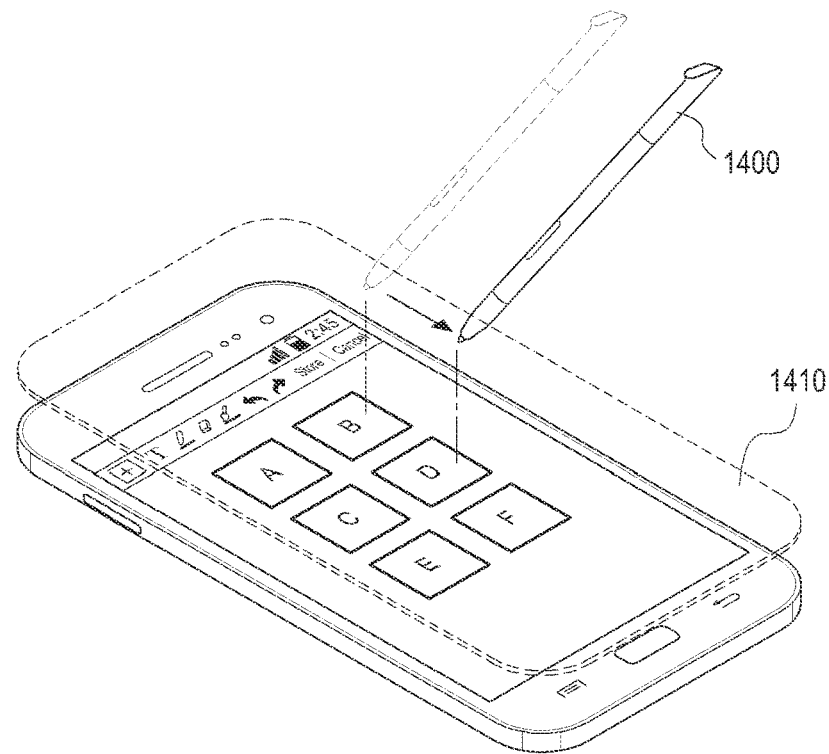
Figure 14B:
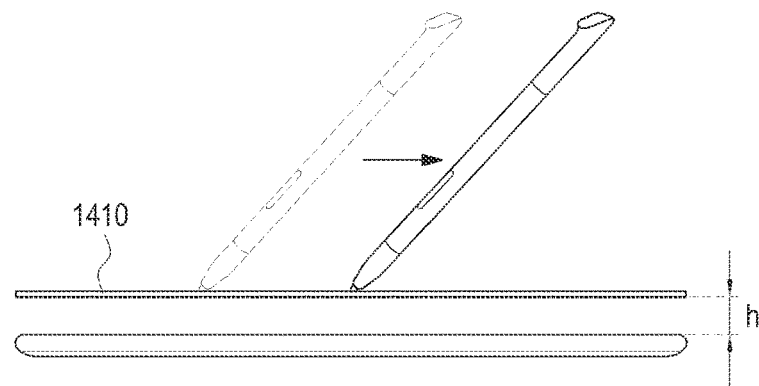

As illustrated in FIG. 14A, when a first floating input is detected by a stylus pen 1400 in a floating area 1410 corresponding to a preset distance from menu B for a preset time in a state where six menus are displayed, the controller 110 selects menu B. Thereafter, when a second floating input is detected in a floating area corresponding to a preset distance from menu D for a preset time according to a movement of the stylus pen 140, the controller 110 may select menu D. At this time, the floating input refers to the detection of an input means such as a non-contact pen or finger in the area 1410 spaced apart from the touch screen by a preset distance (h) and the detection of a movement of the detected input means as illustrated in FIG. 14B.

When the menu is selected, the controller 11 may select the menu by detecting an up/down movement in a non-contact state by using a detection sensor for detecting a change in a height.

Figure 15A:
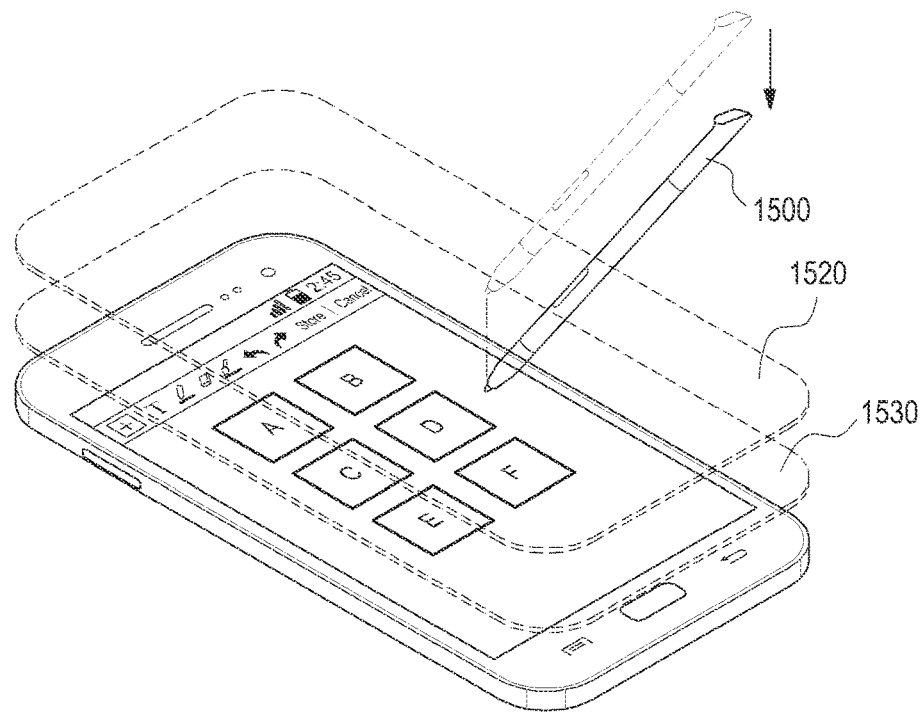
FIGS. 15A and 15B illustrate an example for describing a process of selecting a menu based on a change in a height of a stylus pen according to an embodiment of the present disclosure.
Figure 15B:
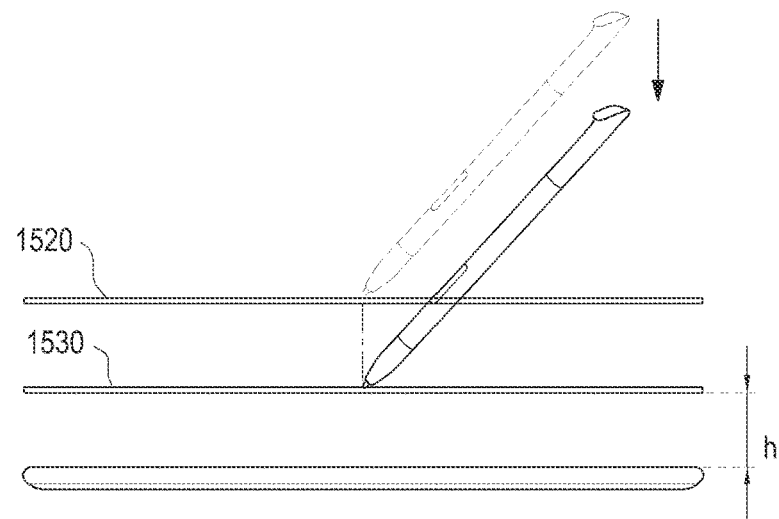

FIGS. 15A and 15B illustrate an example for describing a process of selecting a menu based on a change in a height of a stylus pen according to an embodiment of the present disclosure.

Referring to FIGS. 15A and 15B, when a stylus pen 1500 located in a first floating area 1520 on the touch screen moves to a second floating area 1530, the controller 110 may select a menu by detecting an up/down movement of the stylus pen 1500.

Thereafter, when the controller 110 does not detect a floating input in the first floating area or the second floating area for a preset time or detects a touch input in areas other than the area for the menu selection on the touch screen 190, the controller 110 may allow an application execution screen to return.

Although the execution of a first application has been described as an example in various embodiments of the present disclosure, various applications and screens can be used.

Further, although the use of the stylus pen has been mainly described in various embodiments of the present disclosure, an input means for a floating touch such as a finger or a pointer can be used. In addition, although the touch screen of the electronic device 100 has been mainly described in various embodiments of the present disclosure, a display screen of a monitor or a tablet PC, not the electronic device 100 can be used. The display screen may include a virtual screen such as a glass type display as well as a physical screen device.

As described above, according to the present disclosure, it is possible to increase the user convenience by using a display screen as widely as possible and conveniently selecting a menu or calling a function without several controls for selecting the menu or calling the function. Further, although the touch screen 190 has been described as a representative example of the display unit in various embodiments of the present disclosure, an LCD, a Light-Emitting Diode (LED), an Organic Light-Emitting Diode (OLED) can be used as the display unit and the touch screen 190 and the touch screen controller 195 may be called a display unit and a display unit controller, respectively.

It may be appreciated that the various embodiments of the present disclosure may be implemented in software, hardware, or a combination thereof. Any such software may be stored, for example, in a volatile or non-volatile storage device such as a ROM, a memory such as a RAM, a memory chip, a memory device, or a memory Integrated Circuit (IC), or a recordable optical or magnetic medium such as a Compact Disc (CD), a Digital Versatile Disc (DVD), a magnetic disk, or a magnetic tape, regardless of its ability to be erased or its ability to be re-recorded. Also, it will be appreciated that an operation control method according to a floating input may be implemented by a computer or a portable terminal which includes a controller and a storage unit (or a memory), and the storage unit may be an example of a machine-readable storage medium that is suitable for storing one or more programs including instructions for implementing the various embodiments of the present disclosure. Accordingly, the present disclosure includes a program including a code for implementing the apparatus and method described in the appended claims of the specification and a non-transitory machine (computer or the like)-readable storage medium for storing the program. Further, the program may be electronically transferred by a predetermined medium such as a communication signal transferred through a wired or wireless connection, and the present disclosure appropriately includes equivalents of the program.

Further, the electronic device can receive the program from a program providing apparatus connected to the device wirelessly or through a wire and store the received program. The program providing apparatus may include a memory for storing a program containing instructions for allowing the electronic device to perform a method of executing an operation according to a floating input and information used for the method of executing the operation according to the floating input, a communication unit for performing wired or wireless communication with the electronic device, and a controller for transmitting the corresponding program to the electronic device according to a request of the electronic device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device performing an operation according to a floating input, the electronic device comprising:
   a user input device;
   a display configured to display a user interface; and
   at least one processor configured to:
      detect a first floating input by the user input device in a first floating area corresponding to a first preset distance in a vertical direction from the display,
      perform a first operation associated with the first floating area in response to a detection of the first floating input,
      detect a second floating input by the user input device in a second floating area corresponding to a second preset distance in the vertical direction from the display, and
      perform a second operation associated with the second floating area in response to a detection of the second floating input,
   wherein the first preset distance of the first floating area is different from the second preset distance of the second floating area, and
   wherein the first operation corresponding to the first floating area is different from the second operation corresponding to the second floating area.

2. The electronic device of claim 1,
   wherein the first floating input corresponds to a detection of the user input device in the first floating area corresponding to a first preset distance from the display, and
   wherein the second floating input corresponds to a detection of the user input device in the second floating area corresponding to second preset distance from the display.

3. The electronic device of claim 1, wherein the at least one processor is further configured to:
   display a first execution screen for the first application on the display,
   determine whether a third floating input is detected, and
   when the third floating input is detected, display a second execution screen corresponding to the detected third floating input on the display.

4. The electronic device of claim 3, wherein the at least one processor is further configured to:
   determine whether a fourth floating input is detected, and call, when the fourth floating input is detected, a function corresponding to the fourth floating input.

5. The electronic device of claim 1, wherein the at least one processor is further configured to:
   display a first execution screen for the first application on the display,
   determine whether a fifth floating input is detected, and
   call, when the fifth floating input is detected, a function corresponding to the detected fifth floating input.

6. The electronic device of claim 5, wherein the at least one processor is further configured to perform the called function according to an input.

7. The electronic device of claim 5, wherein the at least one processor is further configured to:
   determine whether a third floating input is detected, and
   when the third floating input is detected, display a second execution screen corresponding to the detected third floating input on the display.

8. The electronic device of claim 1, wherein the first floating input or the second floating input is detected after being detected for a preset time.

9. A method of performing an operation according to a floating input by an electronic device, the method comprising:
   detecting a first floating input by a user input device in a first floating area corresponding to a first preset distance in a vertical direction from a display of the electronic device,
   performing a first operation associated with the first floating area in response to a detection of the first floating input,
   detecting a second floating input by the user input device in a second floating area corresponding to a second preset distance in the vertical direction from the display, and performing a second operation associated with the second floating area in response to a detection of the second floating input,
   wherein the first preset distance of the first floating area is different from the second preset distance of the second floating area, and
   wherein the first operation corresponding to the first floating area is different from the second operation corresponding to the second floating area.

10. The method of claim 9,
    wherein the first floating input corresponds to a detection of the user input device in the first area corresponding to the first preset distance from a display, and
    wherein the second floating input corresponds to a detection of the user input device in the second floating area corresponding to second preset distance from the display.

11. The method of claim 9, wherein the determining of whether the floating input by the user input device is detected comprises:
    displaying a first execution screen for the first application on the display; and
    determining whether a third floating input is detected.

12. The method of claim 11, further comprising:
    when the third floating input is detected, displaying a second execution screen corresponding to the detected third floating input.

13. The method of claim 12, further comprising:
    determining whether a fourth floating input is detected; and
    calling, when the fourth floating input is detected, a function corresponding to the fourth floating input.

14. The method of claim 11, further comprising:
    when a fourth floating input is detected, calling a function corresponding to the detected fourth floating input.

15. The method of claim 14, further comprising:
    performing the called function according to an input.

16. The method of claim 14, further comprising:
    determining whether a third floating input is detected; and
    displaying, when the third floating input is detected, a second execution screen corresponding to the detected third floating input on the display.

17. The method of claim 9, wherein the first floating input or the second floating input is detected after being detected for a preset time.

* * * * *